United States Patent
Lueers et al.

(10) Patent No.: US 6,770,128 B1
(45) Date of Patent: Aug. 3, 2004

(54) MATTING AGENT RADIATION FOR CURING COATINGS

(75) Inventors: Georg Lueers, Westhofen (DE); David Joseph Kent, Frankenthal (DE); Volker Petry, Ottebach (DE); Ute Pospesch, Worms (DE)

(73) Assignee: Grace GmbH & Co. KG, Worms (DE)

( * ) Notice: Subject to any disclaimer, the term of this patent is extended or adjusted under 35 U.S.C. 154(b) by 0 days.

(21) Appl. No.: 09/546,735

(22) Filed: Apr. 11, 2000

Related U.S. Application Data (60) Provisional application No. 60/129,007, filed on Apr. 13, 1999.

(51) Int. Cl.$^7$ .............................. C08K 3/36; C08K 9/04; C08L 91/06; C09D 4/00

(52) U.S. Cl. ........................ 106/272; 106/482; 106/502; 522/83; 522/90; 522/95; 522/96; 522/103; 522/173; 522/182; 524/493

(58) Field of Search .............................. 522/83, 79, 95, 522/96, 103, 173, 182, 80; 106/272, 482, 502, 266; 524/493

(56) References Cited

U.S. PATENT DOCUMENTS

| | | |
|---|---|---|
| 2,838,413 A | 6/1958 | Young |
| 3,607,337 A | 9/1971 | Eisenmenger et al. |
| 3,816,154 A | 6/1974 | Baldyga et al. |
| 4,097,302 A | 6/1978 | Cohen et al. |
| 4,595,578 A | 6/1986 | Cohen et al. |
| 5,123,964 A | 6/1992 | Kerner et al. |
| 5,221,337 A | 6/1993 | Luers et al. |
| 5,326,395 A | 7/1994 | Aldcroft et al. |
| 6,039,798 A * | 3/2000 | Aldcroft et al. ............ 106/272 |
| 6,384,101 B1 * | 5/2002 | Park et al. .................... 522/71 |
| 6,680,087 B2 * | 1/2004 | Park et al. ................... 427/508 |

FOREIGN PATENT DOCUMENTS

| | | | |
|---|---|---|---|
| EP | 442325 | 8/1991 | ............ C09C/1/30 |
| EP | 541359 | 5/1993 | ............ C09C/1/30 |
| WO | WO 97/08250 | 3/1997 | |
| WO | WO 98/58030 | 12/1998 | ............ C09D/7/12 |

* cited by examiner

*Primary Examiner*—Susan Berman
(74) *Attorney, Agent, or Firm*—Charles A. Cross; William D. Bunch (57) ABSTRACT

A matting agent composition comprises silica and wax wherein the composition has a median particle size in the range of about 2–12 microns, a wax content in the range of about 15–30 wt. % and the silica has a pore volume in the range of about 0.8 to 1.4 cc/g. The matting agent is particularly suitable for radiation curable coatings. The matting agent has been shown to be particularly efficient in such coatings, as well as shows consistent gloss over varying coat weights.

29 Claims, 7 Drawing Sheets

Invention: Matting Efficiency in an "Easy-to-matt" UV Lacquer based on Ebecryl 270

Influence of Wax Content on Matting Efficiency in Ebecryl 270 (easy-to-matt)

Figure 3
Comparison of different Matting Agents in Laromer PO 43F
(20% O₂, 160 W/cm²CK, 10m/min)

Invention: Matting Efficiency in an "Easy-to-matt" UV Lacquer based on Ebecryl 270

Figure 7

MATTING AGENT RADIATION FOR CURING COATINGS

This application claims priority under 35 U.S.C. § 119 of the following provisional application Serial No(s). 60/129,007 and filing date(s) Apr. 13, 1999.

FIELD OF INVENTION

The invention relates to wax-coated, silica-matting agents and their application in the matting of radiation curable systems.

BACKGROUND TO THE INVENTION

As noted in WO97/08250, radiation curable, e.g., ultraviolet (UV) curable, compositions are used to coat a variety of surfaces. These compositions provide a number of advantages, of which include rapid curing, superior durability, chemical resistance and storage stability. However, they also result in relatively hard, smooth and glossy coatings. As these coatings become more widely used, there are more and more instances where it is preferable to reduce the gloss of these coatings. Reducing this gloss is also known as matting. Matted surfaces provide the finished articles with a more pleasing appearance, as well as hide imperfections at the surface, especially in wood, furniture, and several other applications.

Silica is one example of an additive used to matt glossy surfaces. Silica matting agents are used in both solvent and water based finishes to reduce or control gloss. However, lacquer systems with a low VOC content are becoming more and more important, due to national and international environmental and legislative pressures. Indeed, in some instances the VOC content in coatings is reduced to substantially zero, i.e., these coatings have a substantially 100% solids content. As a result, films prepared from these coatings may shrink by only 5 to 15% upon curing. This low shrinkage prevents conventional silica matting agents from efficiently matting at their conventional levels. For example, silica matting agents which work effectively in lacquer systems in which the film shrinks up to 70% as the film's solvent evaporates, are not able to matt high solids, radiation (EB, UV) curing systems efficiently. Specifically, the film thickness of a UV curable coating is not reduced to a point the silica particles can cause deformations on the film's surface.

In addition, a matting agent's effectiveness in radiation curable coatings is affected by the time necessary for curing the coating. Fast curing compositions are more difficult to matt using conventional agents. Today a wide range of radiation-curable lacquers are available. Most lacquers are based on combinations of acrylate functional prepolymers (oligimers) and monomers, together with photoinitiators in the case of UV curing. The curing time of these systems is dependent on their composition and on the processing environment. Therefore, both the lack of film shrinkage and short curing time in certain radiation curable compositions (fractions of a second) hinders the efficacy of matting agents.

Special techniques such as "dual cure" methods have been used to matt UV curable systems. These techniques involve a two stage (hence "dual") cure process, designed to encourage the formation of a microrough surface, either through improved orientation of the matting agent particles towards the film surface or through surface wrinkling. An example of the former is "Gradient Intensity Cure" process involving a pregelling cure stage followed by a final surface cure stage. These techniques have the disadvantages of requiring specially designed equipment and formulations, as well as being notoriously difficult to control.

Another technique to reduce gloss in these coatings is to use higher levels of matting agents. However, high dosages of silica matting agent increases cost and also has a negative impact on lacquer properties, e.g., rheology or optical properties of the cured film.

The pore volume of the matting agents can be modified to reduce affects on rheology. However, lowering the pore volume of conventional micronized amorphous silica agents results in particles of higher apparent density, which in turn results in fewer particles per unit volume in the lacquer formulation. Because the number of particles have a direct influence on matting efficiency, an amorphous silica matting agent with a low pore volume exhibits a lower matting effect than a matting agent with a higher pore volume of the same particle size distribution.

Coarser or larger particles could also increase the gloss reduction of the cured film. However, increasing the particle size of the micronised product can adversely increase the surface roughness of the lacquer film to an unacceptable degree.

It is also known that with increasing film thickness and using coating compositions having higher cure rates, matting becomes increasingly more difficult. In those situations, matting can be maintained to a certain extent by increasing the amounts of matting agent. Increasing the number of micronized particles, however, dramatically and adversely changes the rheological properties of the lacquer.

In summary, due to the fast curing of UV-systems and the difficulties of matting such systems, it has been a practice to choose a micronized matting agent with a mean particle size which is close to the thickness of the film after it cures. Accordingly, when one is using a particular coating, the matting agent that can be used is one that has a particle size close to the film thickness of the resulting coating.

It is therefore desirable to have a matting agent which is efficient in radiation curable coatings and can be used at relatively low levels so that viscosity of the formulation is not adversely affected. It is also desirable to have a matting agent that is efficient for fast and slow curing systems, thereby offering the user of the matting agent greater flexibility. In other words, it would be desirable to have available a matting agent that produces stable, reproducible low gloss coatings for a variety of coating formulations without the usual problems of unworkable viscosity increases, inconsistent gloss values at varying coating weight and avoids the use of special application techniques to reduce gloss. In addition, it is also desirable that the agent produces a consistent matting effect over a wide range of thicknesses.

SUMMARY OF THE INVENTION

The aforementioned objects are unexpectedly obtained by employing silica matting agents having a maximum pore volume of 1.4 ml/g and a wax content of at least 15% and maximum of 30% by weight. The wax content typically is in the range of 18 to 22% by weight. The wax preferably has a melting point in the range of 60–120° C., and most preferably in the range of 60–90° C. The matting efficiency of the agent is also affected by the particle size of the invention. The invention has a median particle size in the range of 2.0–12.0 $\mu$m, with a preferred range of 2.0–5.0 $\mu$m. It is also unexpected that the matting agents having particles sizes in the lower part of above ranges can enhance matting efficiency further without significant adverse affects on the viscosity of the coating composition.

The wax coated silica-matting agents can be used with a variety of radiation curable compositions and can be manufactured by simultaneously melting and milling the wax and silica to the desired particle size. The milling process is preferably carried out in a fluid energy mill with an inlet temperature which is above the melting point of the used wax.

DETAILED DESCRIPTION

The silica used to prepare the invention can be that used to prepare conventional porous silica flatting agents, provided the silica has a pore volume in the range of 0.8 to 1.4 cc/g. Preferably, the pore volume of the silica is in the range of 0.9–1.2 cc/g. The pore volume referred to herein is determined by nitrogen porosimetry, described later below.

Silica gels are preferred. Hydrogels, xerogels and aerogels are all suitable. The general procedure to prepare inorganic gels is by the acid neutralization of salt solutions of metals or metalloids, which, thereafter upon standing form hydrogels. The hydrogels must then be washed to remove the relatively high concentration of soluble salts. Treatment during this washing stage determines physical properties, such as porosity, of the final product. The techniques for obtaining those properties are known. For example, final gel pore volumes and surface areas are dependent upon the pH and temperature of the wash solution, the rate of wash, the particle size of the hydrogel, and the duration of wash. Generally, pore volume can be limited by shortening the duration of the washing periods. However, the specific washing conditions can vary depending on the particular inorganic hydrogel used, and are not per se critical to the invention, provided that the aforementioned pore volumes are developed in the final gel. As mentioned above, those skilled in the art are familiar with these washing conditions and are readily able to determine suitable washing conditions in which to form the desired pore volumes for use in this invention. For example, silica gels washed at a starting pH of 3–5 at 50–90° C. for 5–25 hours form gels (aerogels) having pore volumes in the aforementioned range.

Particularly suitable silicas include hydrogels used to make commercially available silica matting agents such as the Syloid® matting agents from Grace Davison.

Suitable waxes are those known to make wax coated matting agents. Wax is added to matting agents to enhance the matting agent's redispersibility in the event the matting agent settles during storage. Waxes having a melting point in the range of 60–120° C. are preferred, with those having a melting temperature in the range of 60–90° C. being most preferred. It is also preferable that the wax is an unbranched linear polyolefin and has an average molecular weight of about 1200 and more preferably 1000 or lower. Paraffin waxes are suitable, but other waxes such as polyethylene waxes are also suitable. WO97/03246 discloses specific examples. Other suitable waxes include Fischer-Tropsch wax commercially available as Vestowax™ grades.

The wax-containing matting agent of this invention can be prepared by conventional co-milling processes in which the wax is melted simultaneously with the comminution of the silica to the desired particle size of about 2 to 12 microns. Such a process is most effectively carried out in a fluid energy mill or microniser. The operating temperature can then be varied according to the requirements of the wax. The inlet temperature of the air being supplied to the fluid energy mill should at least be high enough to ensure the wax melts within the residence time profile of the milling equipment. The wax is added to the mill so that the final product has a wax content of 15 to 30% by weight.

The matting agent of the invention can be used with a variety of radiation curable compositions designed for coating substrates. The coating composition can be those cured by ultraviolet radiation and electron beam radiation.

Ultraviolet curable compositions generally comprise components containing unsaturated groups. Acrylate-containing compounds are typically used. Acrylate-based UV curable compositions generally comprise an acrylate-terminated oligimer combined with a lower molecular weight acrylate monomer, with the latter also referred to as a reactive diluent. Suitable oligimers are those derived from well known isocyanate, or epoxy-containing compounds, as well as those based on polyester, polyether or amino compounds.

The reactive diluent can be polyfunctional or monofunctional. Suitable polyfunctional acrylate reactive diluents include trimethylolpropane triacrylate, pentaerythritol triacrylate, hexanediol diacrylate, tripropyleneglycol diacrylate, and others. Suitable monofunctional acrylates include ethylhexyl acrylate, 2-Hydroxyethyl acrylate, ethoxyethoxyethyl acrylate, isobornyl acrylate, and 2-carboxyethyl acrylate.

The nature of the radiation curable coatings and their applications are known and described in *Organic Coatings, Science and Technology*, Volume 2, pp 253–272 (1994). As mentioned earlier the compositions that cure at faster rates are more difficult to matt, and in addition to showing superior efficiency in compositions which cure at lower rates, the invention provides relatively efficient matting in those compositions as well. The matting agents are added to the radiation curable compositions using standard techniques.

The paragraphs directly following describe the tests and formulations used to evaluate the invention.

A) Nitrogen Surface Area—Pore Volume

Nitrogen surface area is determined by standard nitrogen porosimetry adsorption methods of Brunauer, Emmett, and Teller (BET) using a multi point method with an ASAP 2400 apparatus by Micromeritics. The samples are degassed under vacuum @ 100° C. for 12 h. Surface area is calculated from the volume of nitrogen gas adsorbed at $p/p_0 0.967$. This apparatus also provides the pore size distribution from which it is possible to get the pore volume size ($D_{10}$) for which of the pores are below this pore size. In the same manner, it is possible to get the pore size for which 50%

($D_{50}$) and 90% ($D_{90}$) of the pores are below this pore size. Additionally the pore volume (ml/g) for a given range of pore size can be obtained from the desorption curve.

B) Viscosity

Viscosity is measured by a Brookfield RVT DV2 Viscometer of the stock solution or by a Bohlin Rheometer VOR of a formulation to reach 30 units gloss. The formulation is allowed to deaerate for 24 h before measurement.

C) Weight Median Particle Size

The weight median particle size or "median particle size" referred to herein is determined with a Malvern Mastersizer using a 100-mm path length lens. This instrument uses the principle of Frauenhoffer diffraction utilizing a low power He/Ne laser. Before measurement the samples were dispersed ultrasonically in water for 10 seconds to form an aqueous suspension. The Malvern Mastersizer measures the weight particle size distribution of the silica. The weight mean particle size ($d_{50}$) the 10-percentile ($d_{10}$) and the 98-percentile ($d_{98}$) are easily obtained from the data generated by the instruments.

D) The carbon content of the coated silicas is determined by a LECO SC44. The carbon present is converted to carbon dioxide at high temperature using the induction furnace. The gas is then detected by an infrared detection system. The wax content (in % w/w) is calculated from the carbon level obtained.

E) Application tests were carried out in a "fast curing" (difficult-to-matt) system based on Laromer PO 83F from BASF, and a "slow" curing (easy-to-matt) system based on Ebecryl 270 from UCB.

The photoinitiators used are benzophenones.

F) Gloss

Gloss and the matting effect inferred from using the invention was measured by DIN 67530, the contents of which are incorporated herein by reference.

G) Coating Formulations

| Laromer ™ PO 83F [BASF]: | |
|---|---|
| Compound | Quantity |
| 1. Laromer PO 83F [amine modified polyether acrylate] | 85.5 g |
| 2. Irgacure ™ 500 | 04.5 g |
| 3. Matting Agent | 10.0 g |

Dispersed at 2000 rpm / 5 min; applied with 24 μm K-Bar
Curing: Line speed 10 m/min; Mercury lamp 120 W; single pass

| Ebecryl ™ 270 [UCB]: | |
|---|---|
| Compound | Quantity |
| 1. Ebecryl 270 [urethane acrylate] | 55.2 g |
| 2. Tripropyleneglycol diacrylate [TPGDA] crosslinkers | 128.8 g |
| ⇒ 5 min mixing @ 2000 rpm | |
| 3. Benzophenon | 7.36 g |
| 4. Irgacure 651 initiator | 3.68 g |
| 5. Matting Agent | 8.0 g |

Dispersed at 2000 rpm / 5 min; applied with 24 μm K-Bar
Curing: Line speed 5 m/min; Mercury lamp 120 W; single pass The stock suspension was prepared by dispersing matting agent in the ready to use lacquer with a Dispermat VMA by Getzmann @ 2000 rpm for 10 minutes.

Matting curves are made by diluting the stock suspension to achieve 5 different matting agent concentrations. The matted lacquer is drawn down with a 25 μm K-Bar on coated test cards (Schwegmann).

EXAMPLES

Samples of wax-containing matting agents were prepared with an AFG 400 fluidized mill and an air inlet temperature of 190° C. The classifier speed and feed rate were set to achieve the appropriate particle size of the coated mirconised product.

Wax coated silica having the following characteristics were produced. The abbreviations appearing in the Tables below are defined as follows:

APS—weight median particle size
PV—pore volume
SA—surface area
PE—polyethylene
COMP—comparison

TABLE 1

| Matting Agent | PV [ml/gl] | SA [ml/gl] | APS [μm] | Wax Type | Wax Content |
|---|---|---|---|---|---|
| INVENTION | 1.10 | 380 | 3.70 | Fischer-Tropsch | 20% |
| COMP 1 | 1.01 | 380 | 7.12 | Fischer-Tropsch | 10% |
| COMP 2 | 2.1 | 270 | 3.29 | Fischer-Tropsch | 20% |
| COMP 3 | 1.8 | 285 | 7.9 | PE wax | 12% |

The matting agents described in Table 1, as well as a matting agent commercially available as Syloid® ED30, were formulated into two coating formulations. The properties of the formulations, along with matting agent properties are reported in Tables 2 and 3 below.

TABLE 2

1. Matting Results in Ebecryl 270 [UCB]:

| Matting Agent | APS [μm] | PV [ml/gl] | Wax Content | Rel. Viscosity of 8% Suspension | Matting efficiency @ 30 Gloss Units |
|---|---|---|---|---|---|
| INVENTION | 3.70 | 1.10 | 20 | 1.52 | 0.54 |
| COMP 1 | 7.12 | 1.10 | 10 | 2.50 | 1.26 |
| COMP 2 | 3.29 | 2.1 | 20 | 1.55 | 0.84 |
| COMP 3 | 7.9 | 1.8 | 12 | 3.37 | 1.00 |
| SYLOID ® ED3O | 6.5 | 1.8 | 10 | 4.41 | 1.06 |

TABLE 3

2. Matting Results in Laromer PO 83F [BASF]:

| Matting Agent | APS [μm] | PV [ml/gl] | Wax Content | Rel. Viscosity of 10% Suspension | Matting @ 60 ° of 10% Suspension |
|---|---|---|---|---|---|
| INVENTION | 3.7 | 1.10 | 20 | 8.47 | 69 |
| COMP 1 | 7.12 | 1.10 | 10 | 4.21 | 75 |
| COMP 2 | 3.29 | 2.1 | 20 | 9.24 | 71 |
| COMP 3 | 7.9 | 1.8 | 12 | 19.39 | 73 |
| SYLOID ® ED3O | 6.5 | 1.8 | 10 | 27.27 | 80 |

The results in Table 2 indicate that when particle size and wax content are kept relatively constant, a matting agent having a pore volume in the range of the invention has better matting efficiency than a matting agent having a pore volume outside the range of the invention, e.g., 2.1 ml/g. Compare the invention with COMP2. This is also illustrated in Table 3 which shows matting and viscosity results from matting agents in the fast curing (difficult-to-matt) system containing Laromer PO 83F. Compare the invention with COMP2 in Table 3.

Figure 1:
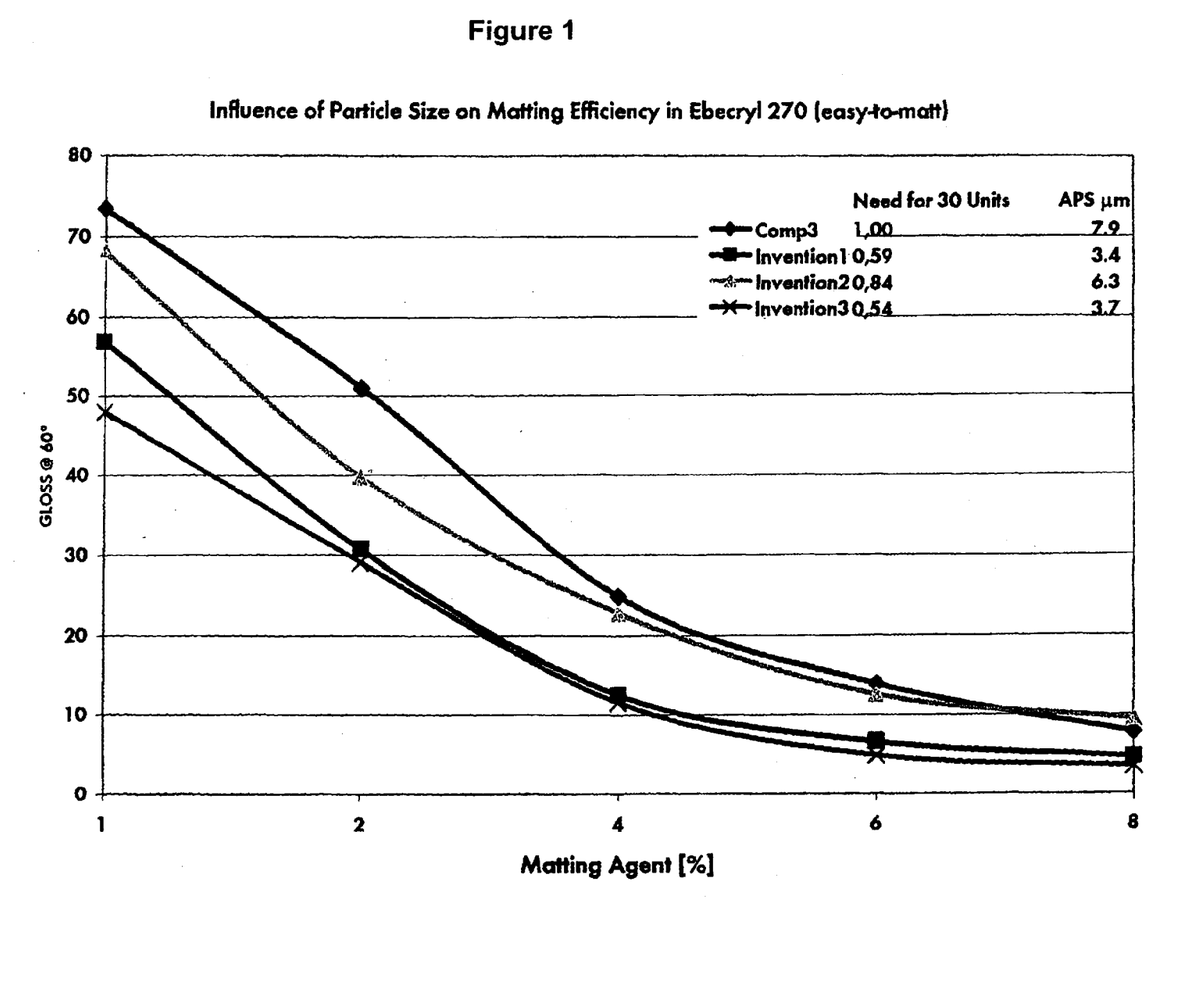
FIG. 1 illustrates the invention and the influence particle size has on the matting efficiency in a radiation (ultraviolet, i.e., "UV") curable composition compared to another matting agent composition.

It has also been unexpectedly found that matting efficiency is enhanced when using matting agents having a smaller APS at the lower end of the particle size range claimed for this invention. See FIG. 1, and compare COMP3 (having an APS of 7.9 μm, PV of 1.85 ml/g and Wax content of 12%) and Invention 2 (APS=6.3 μm, PV=1.01 ml/g, and Wax content of 20%) with Invention 1 (APS=3.4 μm, PV=1.01 ml/g, and Wax content of 20%) and Invention 3 (APS=3.7 μm, PV=1.01 ml/g, and Wax content of 20%).

Figure 2:
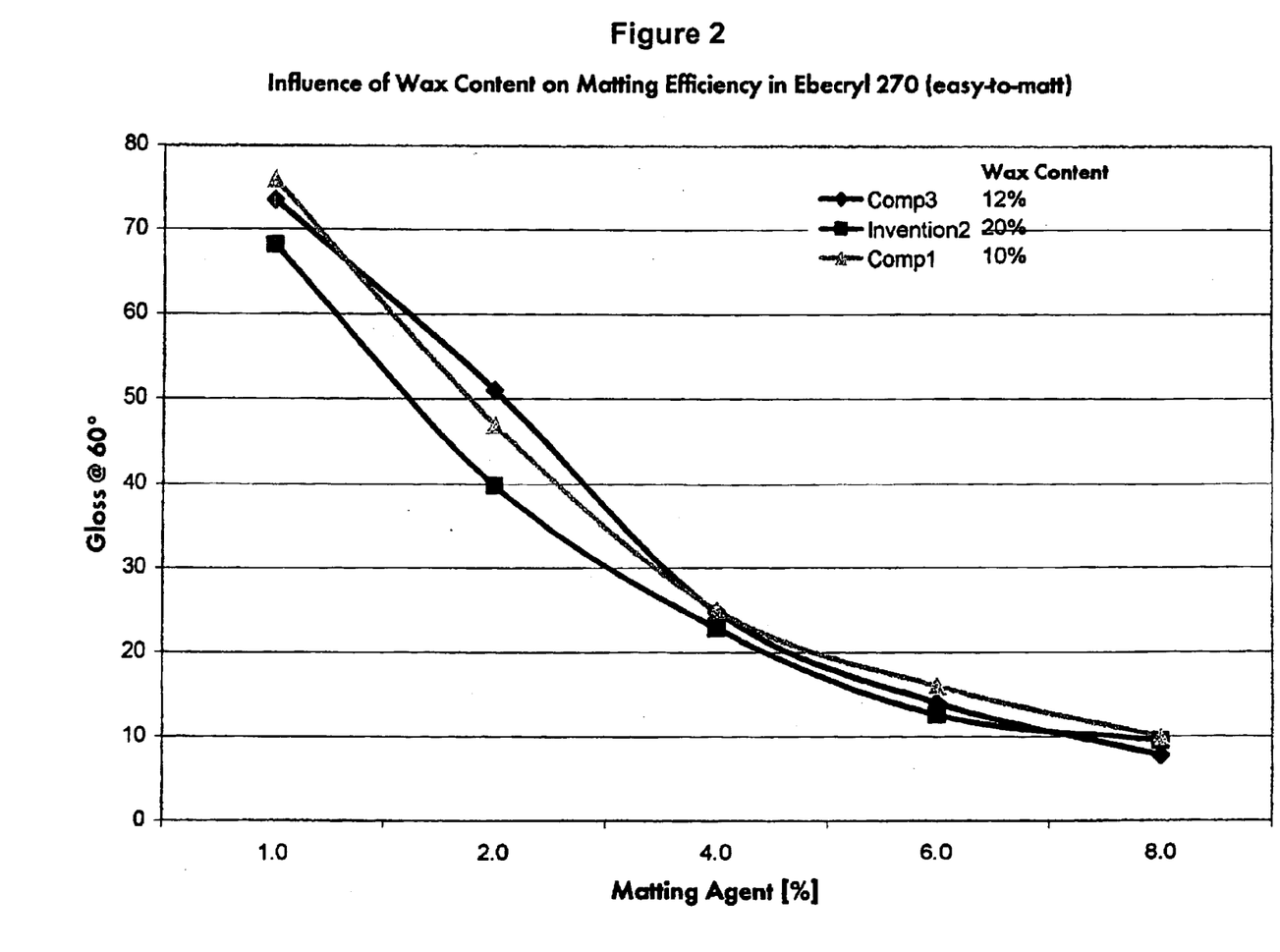
FIG. 2 illustrates the invention and the influence wax content in the invention has on matting efficiency in a radiation curable composition compared to other matting agents.

FIG. 2 shows that wax contents greater than 15% and preferably 20%, increases the gloss reduction of the cured film compared to conventional matting agents having wax contents less than 15% by weight. COMP1 and COMP3 are defined earlier and Invention 2 comprising 20% by weight wax is defined above.

Figure 3:
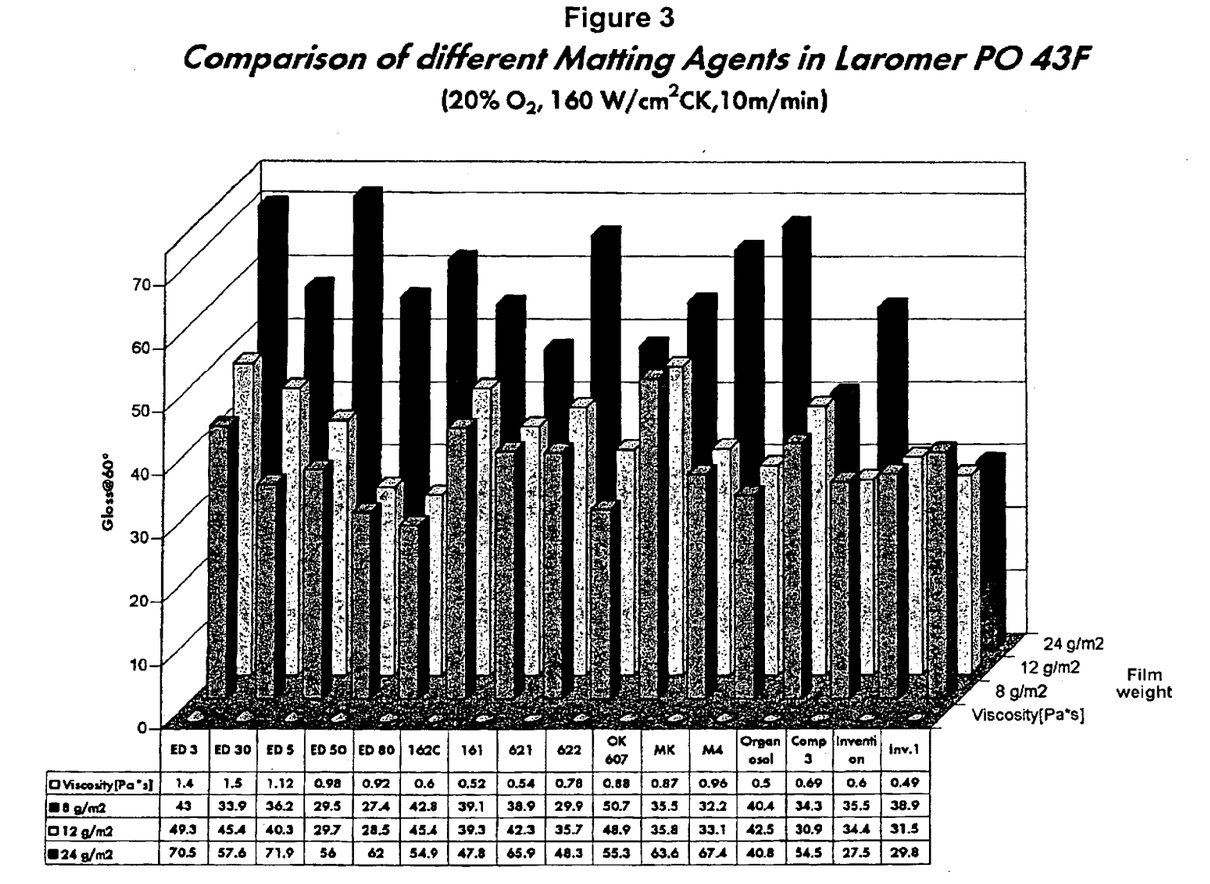
FIG. 3 illustrates the viscosity of radiation curable compositions containing the invention and comparison matting agents at various coating thicknesses.

FIG. 3 shows an unexpected effect that gloss is independent of film weight and that the invention can reduce gloss with increasing film weight. The first thirteen (13) samples from left to right in FIG. 3 are commercially available matting agents. COMP3 and Invention 1 are defined above. The sample labelled Invention is defined in Tables 2 and 3 also above.

Figure 4:
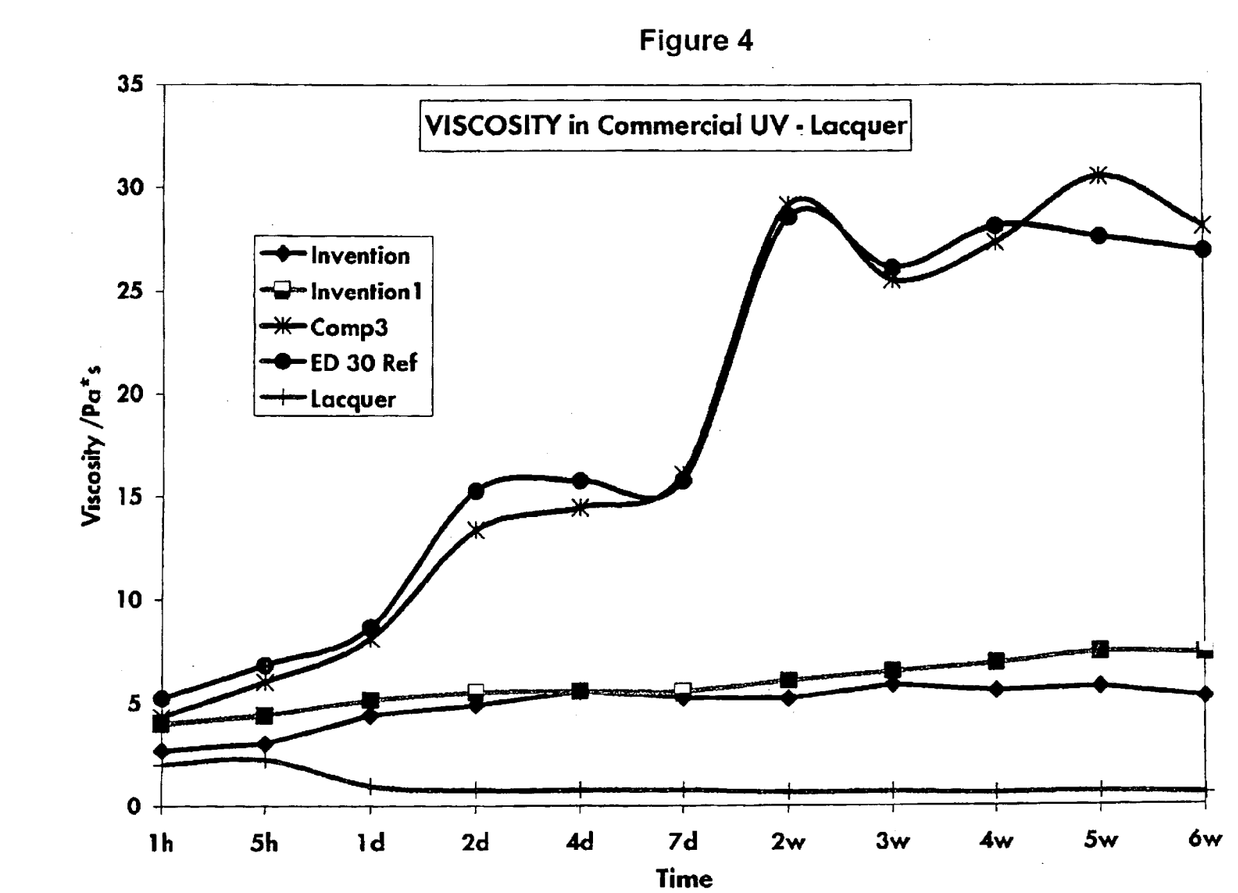
FIG. 4 illustrates the viscosity of a commercial radiation (UV) curable composition containing the invention and comparison matting agents over extended periods of time. These viscosity measurements over time reflect what is referenced herein as viscosity stability.

FIG. 4 shows that coating compositions according to the invention have lower viscosity and that the viscosity is more stable over time compared to conventional matting agents. Without being held to any particular theory, it is believed that this effect is caused by the lower PV, higher SA and therefore better wax coating of the particles. This avoids particle interactions and increases the relative internal porosity. It is believed that the same reasons are responsible for the increased gloss stability of the new silica matting agent. Viscosity stability enables the lacquer formulator to use the lacquer after 24 h without further gloss fluctuations.

Figure 5:
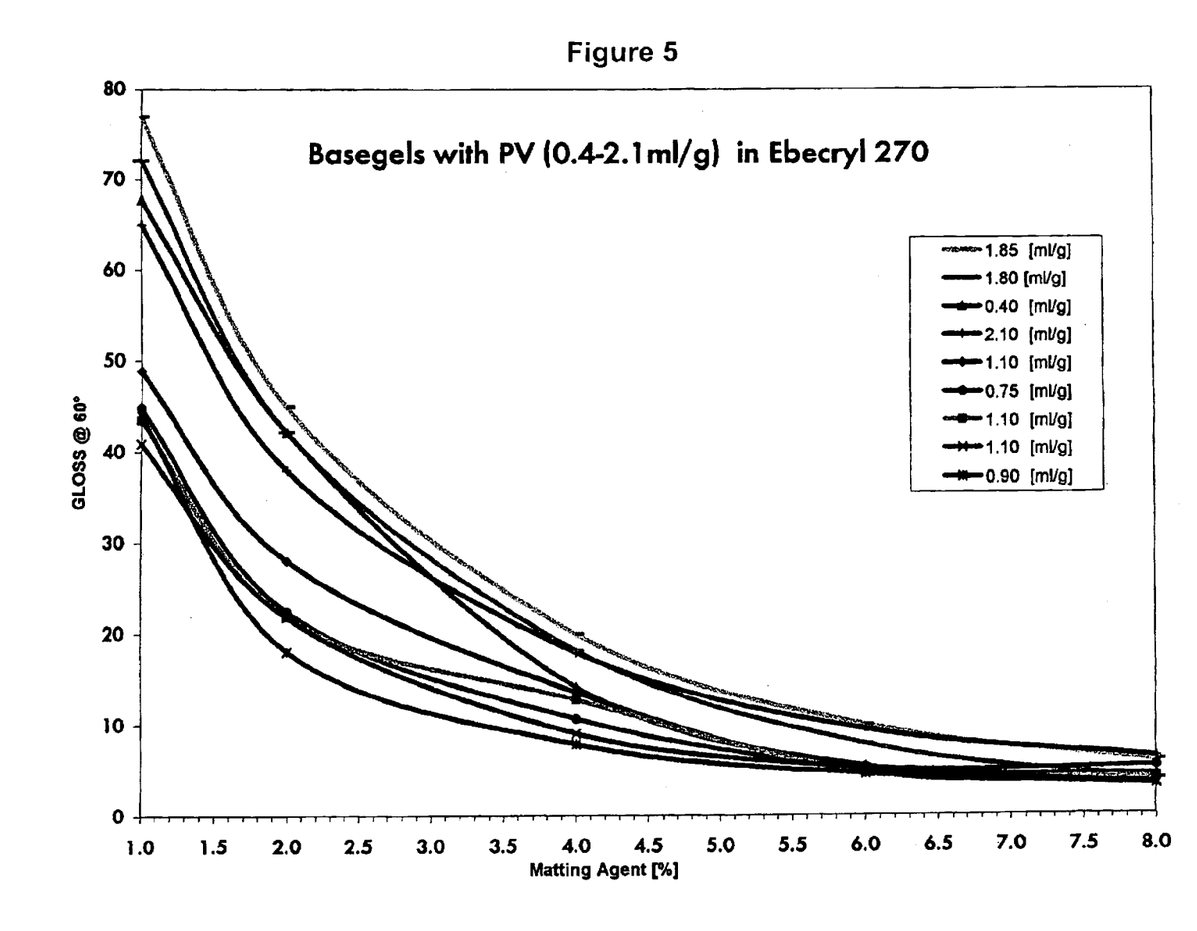
FIG. 5 illustrates how pore volume in the matting agents of this invention and comparison matting agents influences matting efficiency in a radiation curable composition.

FIG. 5 shows that matting agents having pore volumes according to the invention provide more efficient matting.

Figure 6:
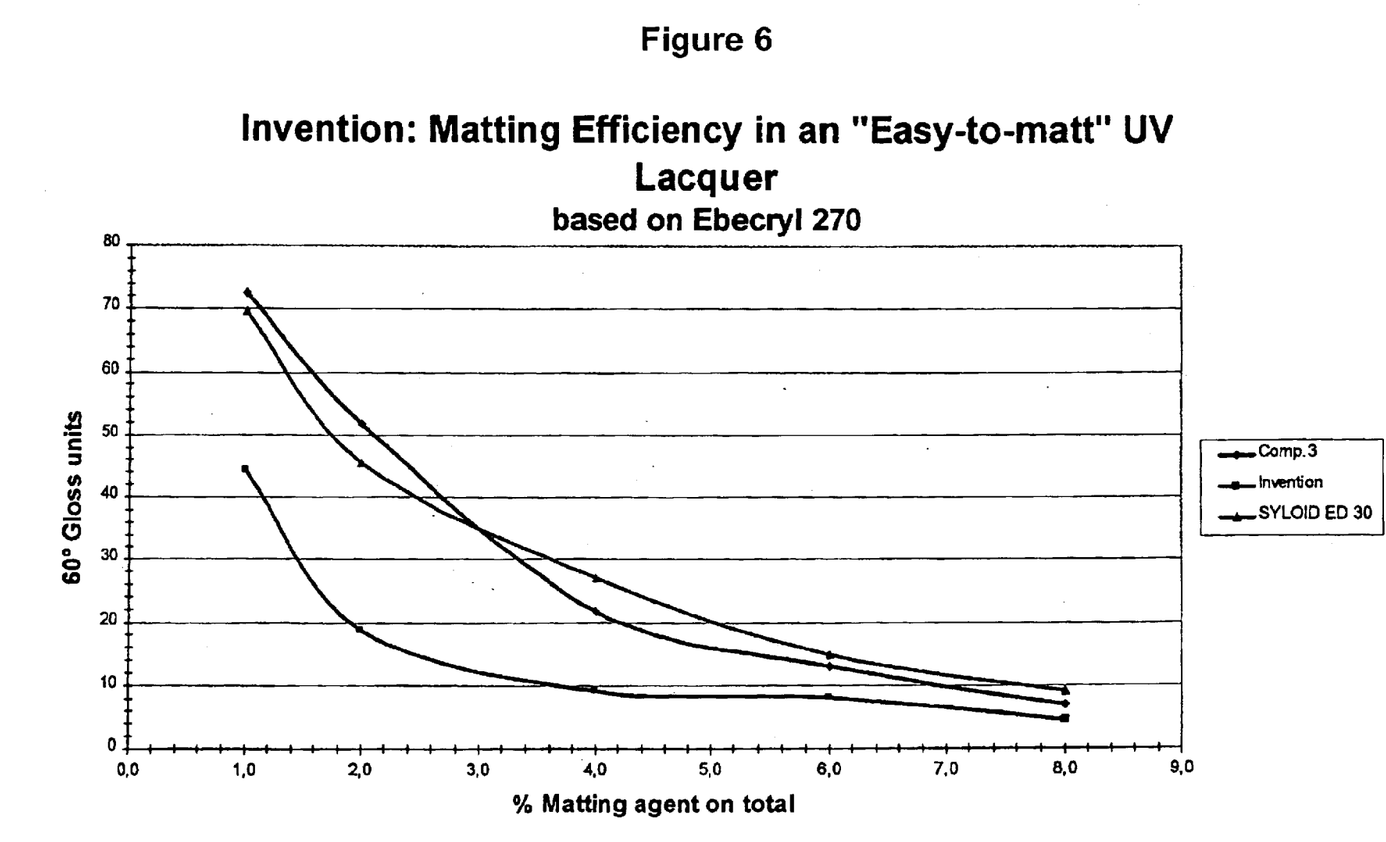
FIG. 6 illustrates the matting efficiency of the invention and comparison matting agents in a specific radiation curable composition known as Ebecryl™ 270.
Figure 7:
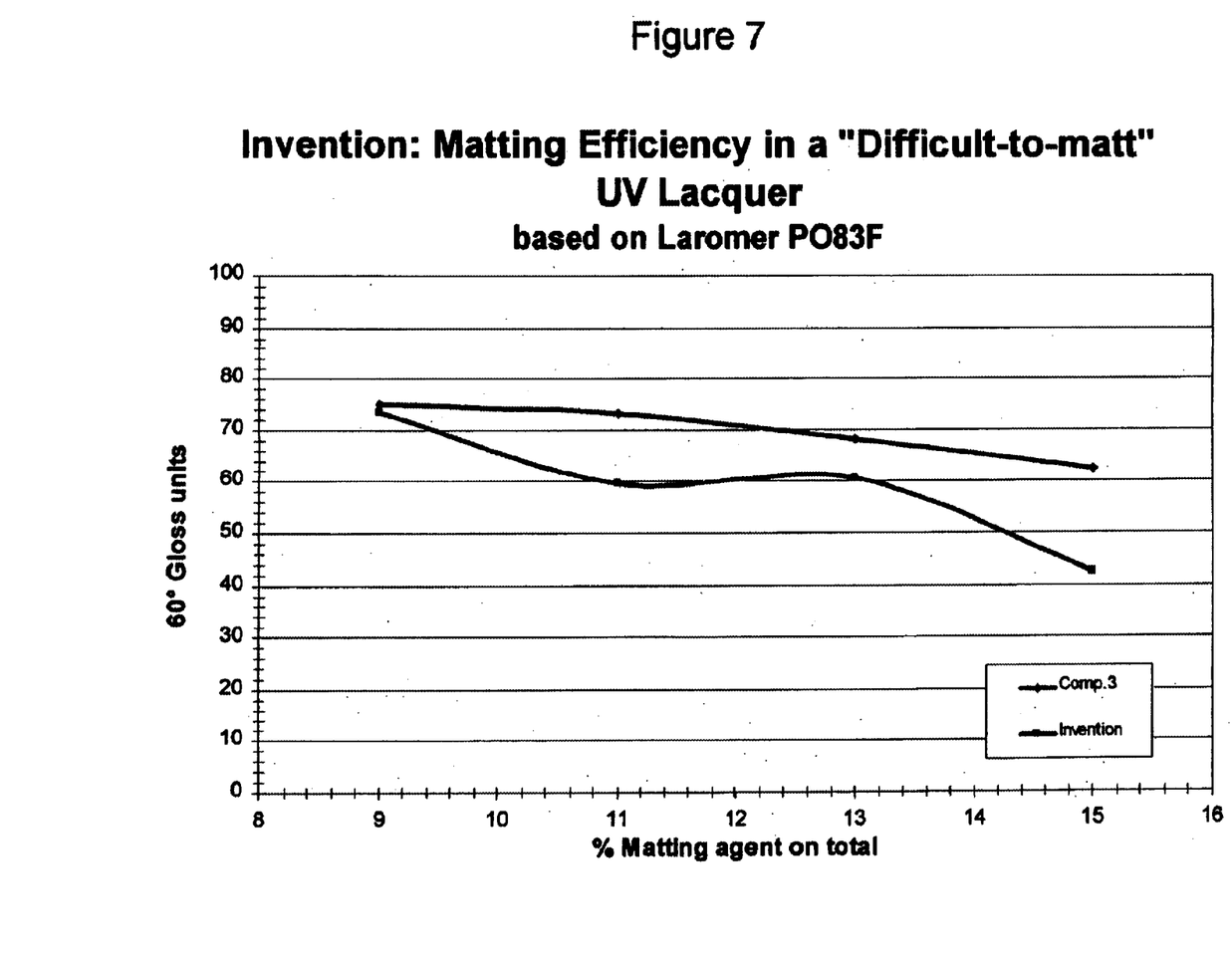
FIG. 7 illustrates the matting efficiency of the invention and a comparison matting agent in a specific radiation curable composition known as Laromer PO83F.

FIGS. 6 and 7 illustrate the matting efficiency of matting agents according to this invention in the two acrylate compositions illustrated above compared to conventional prior art matting agents.

What is claimed is:

1. A matting agent composition comprising silica and wax wherein the composition has a median particle size in the range of 2 to about 5 microns, a wax content in the range of about 18 to 30% by weight of the silica and the silica has a pore volume in the range of about 0.8 to 1.4 cc/g.

2. A matting agent composition according to claim 1 wherein the wax content is about 18–22% by weight.

3. A matting agent composition according to claim 2 wherein the silica has a pore volume in the range of about 0.9 to about 1.2 cc/g.

4. A matting agent composition according to claim 1 wherein the wax has a melting point in the range of 60–120° C.

5. A matting agent composition according to claim 1 wherein the wax has a melting point in the range of 60–90° C.

6. A matting agent composition according to claim 4 wherein the wax is paraffin and has a melting point in the range of 60–90° C.

7. A matting agent composition according to claim 1 wherein the silica has a pore volume in the range of about 0.9 to about 1.2 cc/g.

8. A coating composition comprising a radiation curable component and a matting agent component, the matting agent component having a median particle size in the range of 2–12 microns, a wax content in the range of about 18 to 30% by weight of the silica and a silica having a pore volume in the range of about 0.8 to 1.4 cc/g.

9. A coating composition according to claim 8 wherein the wax content is about 18–22% by weight.

10. A coating composition according to claim 8 wherein the wax has a melting point in the range of 60–120° C.

11. A coating composition according to claim 8 wherein the wax has a melting point in the range of 60–90° C.

12. A coating composition according to claim 8 wherein the median particle size of the matting agent component is about 2 to 5 microns.

13. A coating composition according to claim 8 wherein the silica has a pore volume in the range of about 0.9 to about 1.2 cc/g.

14. A coating composition according to claim 8 wherein the radiation curable component is curable by exposure to ultraviolet radiation.

15. A coating composition according to claim 8 wherein the radiation curable component is curable by election beam radiation.

16. A coating composition according to claim 8 further comprising a curing initiator.

17. A coating composition according to claim 8 wherein the radiation curable component comprises at least one acrylate-containing compound and the coating composition comprises matting agent component present in an amount of 2% by weight or less.

18. A coating composition according to claim 8 wherein the median particle size of the matting agent component is about 6 microns.

19. A substrate comprising a cured coating thereon, said coating comprising a radiation cured component and matting agent component, the matting agent component having a median particle size in the range of 2–12 microns, a wax content in the range of about 18 to 30% by weight of the silica and a silica having a pore volume in the range of about 0.8 to 1.4 cc/g.

20. A substrate according to claim 19, wherein the coating has a matting efficiency of about 20 gloss units or less at 60°.

21. A coated substrate comprising a substrate and coating thereon prepared by curing a composition comprising amine-modified polyether acrylate and wax-containing silica matting agent component present in an amount of about 12% by weight or less and the coating has a matting efficiency of about 60 gloss units or less at 60°.

22. A coating composition comprising a radiation curable component and a matting agent component, the matting agent component having a median particle size in the range of 2–12 microns, a wax content in the range of about 15 to 30% by weight of the silica and a silica having a pore volume in the range of about 0.8 to 1.4 cc/g wherein the radiation curable component comprises at least one acrylate-containing compound.

23. A coating composition according to claim 22 wherein the radiation curable component is curable by exposure to ultraviolet radiation.

24. A coating composition according to claim 22 wherein the radiation curable component is curable by electron beam reaction.

25. A coating composition according to claim 22 further comprising a curing initiator.

26. A coating composition according to claim 22 wherein the radiation curable component comprises at least one acrylate-containing compound and the coating composition comprises matting agent component present in an amount of 2% by weight or less.

27. A coating composition according to claim 22 wherein the median particle size of the matting agent component is about 6 microns.

28. A coated substrate comprising a substrate and a coating thereon prepared from a composition according to claim 22.

29. A coated substrate comprising a substrate and a coating thereon prepared from a composition of claim 22 and the coating has a matting efficiency of about 20 gloss units or less at 60°.

* * * * *